United States Patent [19]

Morrison et al.

[11] Patent Number: 5,606,211

[45] Date of Patent: Feb. 25, 1997

[54] AMORTISSEUR WINDING ARRANGEMENT, IN A ROTOR FOR ELECTRICAL, ROTATING EQUIPMENT

[75] Inventors: Darrell R. Morrison, Blaine; James L. Nessa, St. Paul; James J. McClurg, Vadnais Heights, all of Minn.

[73] Assignee: Dresser-Rand Company, Corning, N.Y.

[21] Appl. No.: 646,578

[22] Filed: May 8, 1996

Related U.S. Application Data

[63] Continuation of Ser. No. 497,972, Jul. 3, 1995, Pat. No. 5,550,417.

[51] Int. Cl.$^6$ .................................................. H02K 1/00
[52] U.S. Cl. ........................... 310/182; 310/211; 310/218
[58] Field of Search ................................. 310/214, 215, 310/216, 218, 182, 211, 210, 183, 261, 190, 191, 209

[56] References Cited

U.S. PATENT DOCUMENTS

| 911,018 | 1/1909 | Lamme | 310/214 |
|---|---|---|---|
| 1,238,304 | 8/1917 | Kuyser | 310/183 |
| 4,469,971 | 9/1984 | Moore | 310/214 |
| 4,617,725 | 10/1986 | Holter et al. | 29/598 |
| 4,739,207 | 4/1988 | Ying et al. | 310/214 |
| 5,113,114 | 5/1992 | Shih et al. | 310/270 |

FOREIGN PATENT DOCUMENTS

| 54-118504 | 9/1979 | Japan | 310/214 |
|---|---|---|---|
| 2-211051 | 8/1990 | Japan | 310/182 |
| 3-15239 | 1/1991 | Japan | 310/214 |

*Primary Examiner*—Steven L. Stephan
*Assistant Examiner*—Jonathan Link
*Attorney, Agent, or Firm*—Bernard J. Murphy

[57] ABSTRACT

Slot wedges, electrically-conductive, used in rotor slots, between rotor teeth, and overlying the rotor coils, are serially arranged in the slots and have arcuate grooves in opposite ends thereof. Inserts, also electrically-conductive, are spring-loaded in the grooves to effect electrical continuity fully therealong, lengthwise of the rotor, from wedge to wedge.

6 Claims, 3 Drawing Sheets

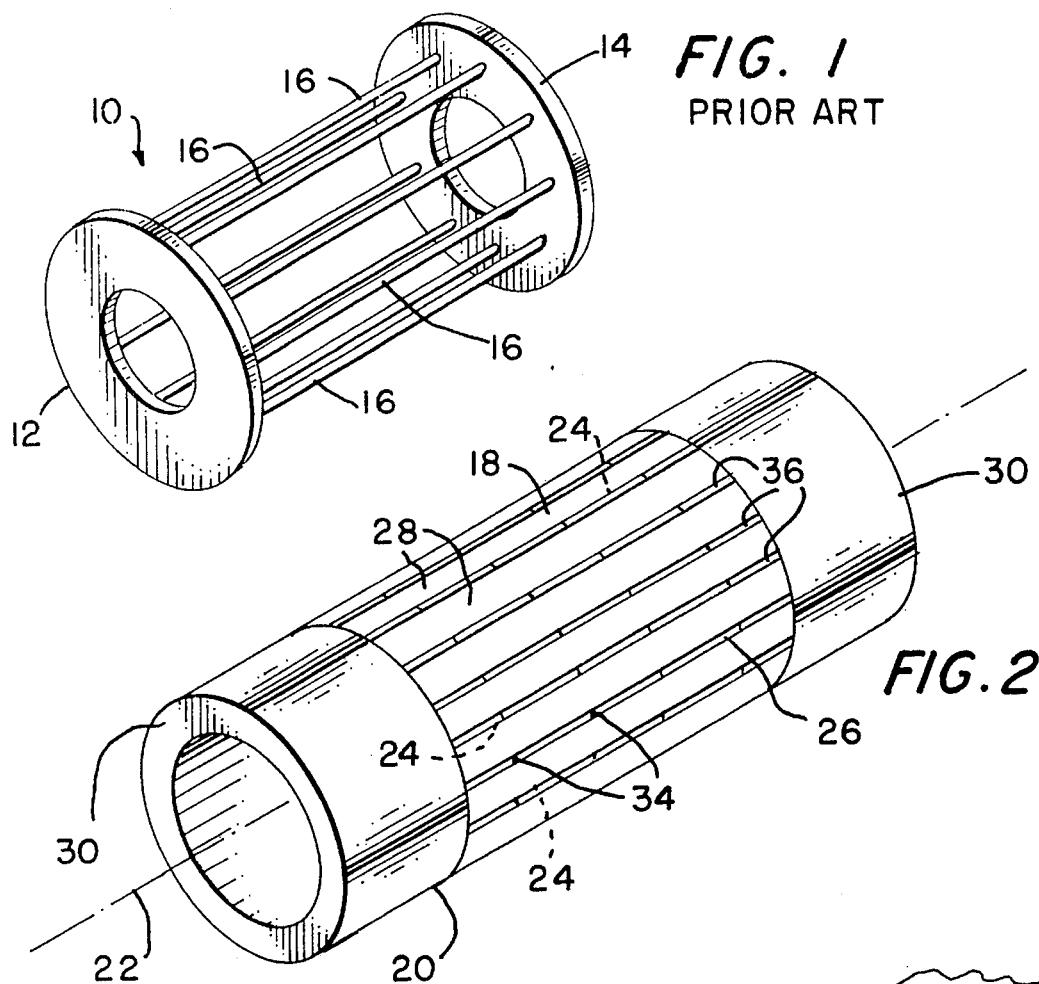
FIG. 1 PRIOR ART
FIG. 2
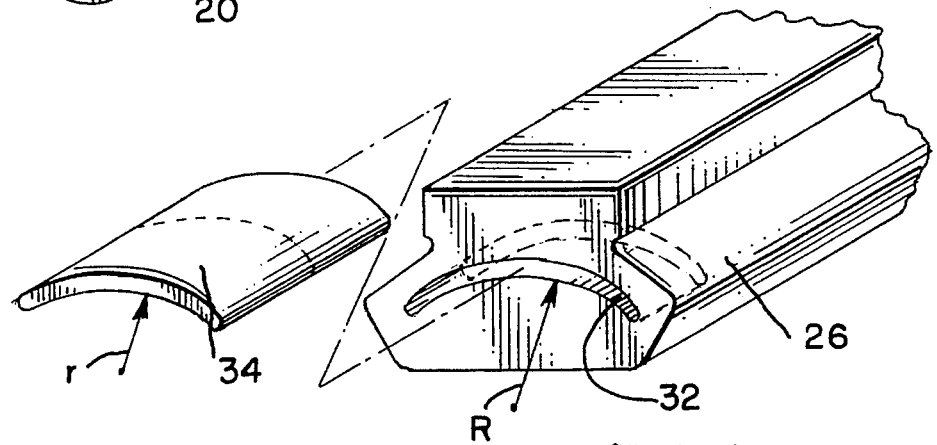
FIG. 3
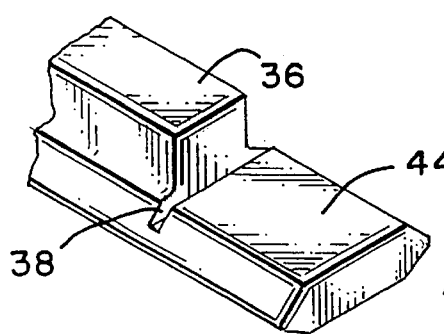
FIG. 4

AMORTISSEUR WINDING ARRANGEMENT, IN A ROTOR FOR ELECTRICAL, ROTATING EQUIPMENT

This application is a continuation under Rule 60 of application Ser. No. 08/497,972, filed Jul. 3, 1995, now U.S. Pat. No. 5,550,417.

This invention pertains to damping wiring, or amortisseur winding arrangements, such as have been used, traditionally, to mitigate harmonic currents on electrical, rotating equipment and, particularly, on the rotors thereof, and especially to a novel amortisseur winding arrangement which uses conductive, segmental wedges for the purpose.

Amortisseur winding arrangements, as noted above, are well known in the technology, and typical thereof are the disclosures set out in U.S. Pat. No. 1,545,673, issued to R. A. McCarthy, for "Damper Winding", on 14 Jul., 1925, and U.S. Pat. No. 1,545,733, for "Damper Winding Support", by inventor C. C. Brinton, and issued also on 14 Jul., 1925. The aforenoted patented arrangements, and others of like constructions, require the use of ancillary parts and components which are beyond those necessary to the fabrication of an efficient rotor for an electrical, rotating equipment, such as a motor or the like.

It would be economical and creative, if there obtained some manner of amortisseur winding arrangement which employed only the conventional rotor structures, with simple modification, to perform the damping function. Accordingly, it is an object of this invention to set forth just such an amortisseur winding arrangement.

Particularly, it is an object of this invention to disclose an amortisseur winding arrangement, in a rotor for electrical, rotating equipment, comprising a rotor having (a) a rotary axis, and (b) axial slots, formed in an outer periphery of said rotor; a plurality of electrically-conductive wedges, serially set in each of said slots, for restraining rotor-carried coils against centrifugal-force-induced movement thereof; and including means engaged with said wedges of said plurality thereof for physically and electro-conductively interconnecting each one of said wedges with at least another of said wedges.

It is also an object of this invention to set forth, in a rotor for electrical, rotating equipment, an amortisseur winding arrangement, comprising a rotor having (a) a rotary axis, and (b) axial slots formed in an outer periphery of said rotor; a plurality of electrically-conductive wedges, set in said slots, for restraining rotor against centrifugal-force-induced movement thereof; wherein said wedges are elongated and serially disposed in said slots so that each of said wedges has an end which abuttingly engages an end of another of said wedges; said wedges have grooves formed therein; and means (a) forceably set in, (b) wholly obscured by, and (c) wholly confined in, said grooves, for physically and electro-conductively interconnecting each of said wedges with at least another one of said wedges.

Further objects of this invention, as well as the novel features thereof, will become apparent by reference to the following description, taken in conjunction with the accompanying figures, in which:

FIG. 1 is a perspective illustration of the typical, prior art amortisseur winding arrangement;

FIG. 2 is a perspective depiction of the novel amortisseur winding arrangement, according to an embodiment of this invention;

FIG. 3 is an exploded view of an insert and its receiving groove in an end of a slot wedge, the latter being only a portion of a full slot wedge;

FIG. 4 is a perspective view of a fragmentary, end portion of an end slot wedge;

Figure 5:
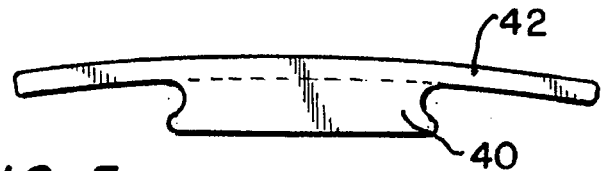
FIGS. 5 and 6 are elevational and bottom views, respectively, of the interconnect used with the end slot wedges.

As shown in FIG. 1, a classic, prior art amortisseur winding arrangement 10 comprises end rings 12 and 14 and a plurality of conductor bars 16 which physically and electro-conductively connect the end rings 12 and 14.

FIG. 2, in a simplified illustration, depicts the invention, according to an embodiment thereof, in association with a rotor body 18. The rotor 20 has a rotary axis 22 and plurality of axial slots 24, and electrically-conductive, slot wedges 26 are serially set in the slots. As is conventi the slot wedges 26 are disposed in the slots 24 to restrain rotor-carried coils against centrifugal-force-induced movement. The slots 24 obtain between the rotor teeth 28 and overlie the rotor coils (not shown in FIG. 2). Axial ends of the rotor 20 carry regaining rings 30 and, as shown and described in the following, the retaining rings 30 effect electro-conductive connection with end slot wedges.

An axial end of a typical slot wedge 26 is shown in FIG. 3, and the arcuate groove 32 formed therein can be seen. The groove has a given depth, and describes an arc drawn from a radius "R", represented by the arrow, of a prescribed dimension. The groove 32 slidably and biasingly receives therein an arcuate insert 34. The given depth of the groove 32 and the axial length of the insert 34 are such that substantially half of the insert 34, that is, from an end thereof to approximately where the dashed line is shown on insert 34, is receivable in the groove 32. Although the groove 32 is arcuate, and the insert 34 is arcuately formed, the latter describes an arc drawn from a radius "r" represented by the arrow associated therewith. Radius "r" is slightly less than radius "R" and, consequently, upon being entered into the groove 32, the insert is spring-loaded, or biasingly held therein.

That is to say that, due to the disparity of radii, the aforesaid half of insert 34 has robe forceably set, and bottomed, in the groove 32. With the remaining or complementary half of insert 34 forceably set in a groove 32 in another, companion slot wedge 26, the insert 34, of course, becomes substantially wholly obscured by, and substantially wholly confined in, the mutually interfacing and abutting grooves 32.

The slot wedges 26 are formed of aluminum, as it typical, whereas arcuate inserts 34 are formed of beryllium copper, and silver-plated, in this embodiment of the invention. Each axial end of the slot wedges 26 has the groove 32 formed therein, to receive a half-length of an insert 34, and the surfaces of the grooves 32 are also silver-plated.

By this means, all the slot wedges 26, in the axial slots 24 of the rotor 20, are physically and forceably joined, and electro-conductively connected, therealong, within the respective slots 24, by the wedge-to-wedge inserts 34, as shown in FIG. 2; there it is seen that the wedges 26 are abuttingly engaged, serially, end-to-end, and the inserts 34 are interposed therebetween, albeit substantially hidden from view for being fully nested in the wedge ends' grooves 32.

Figure 6:
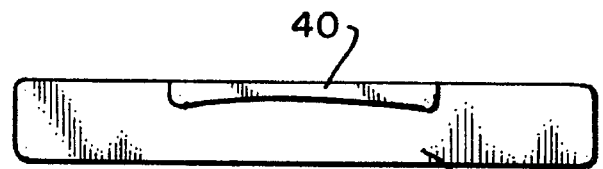

To establish electrical continuity with axial ends of the rotor 20, the slots 24 receive especially configured end slot wedges 36, an axial end of one such end slot wedge 36 being shown in FIG. 4. Adjacent the ends of wedge 36 are formed straight, transverse recesses 38. The latter are provided to receive, biasingly, the underlying tang 40 of an interconnect FIGS. 5 and 6 illustrate the interconnect 42 which, the same as inserts 34, is formed of beryllium copper and silver plated. The underlying tang is formed into a slight arc so that, upon the tang 40 being set into the straight recess 38, it will be held fast by a spring-loaded action.

Figure 7:
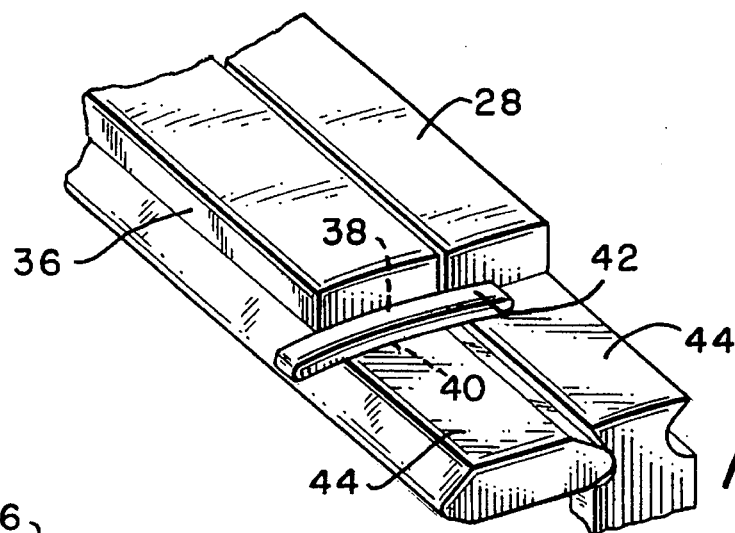
FIG. 7 depicts an interconnect biasingly engaged with an end slot wedge, and an associated, adjacent rotor tooth.
Figure 8:
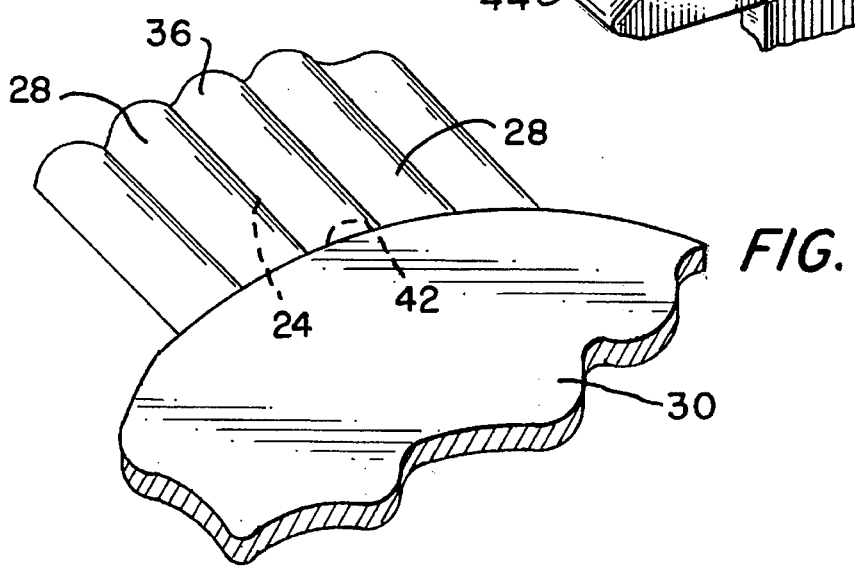
FIG. 8 shows a limited portion of an end retaining ring, adjacent rotor teeth and an intervening, end slot wedge.

FIG. 7 pictorially shows one of the interconnects 42 biasingly held in the recess 38 adjacent one end of an end slot wedge 36, and FIG. 8 epicts how the end slot wedges and retaining rings 30 are electrically given continuity. The ends of the slot wedges 36 and the ends of the rotor teeth 28, outboard of the recesses 38, have relieved, lands 44 (FIGS. 4 and 7).

The retaining rings 30 mount onto the lands 44 and interconnects 42.

Consequently, the retaining rings 30 serve like amortisseur winding end rings, and the end-to-end connected slot wedges 26 and end slot wedges 36 act like the known conductor bars of an amortisseur winding. FIG. 8 shows a limited portion of a retaining ring 30, and an end slot wedge 36 interposed between rotor teeth 28; the retaining ring 30 is mounted onto the now-hidden land 44 and interconnect 42.

Figure 9:
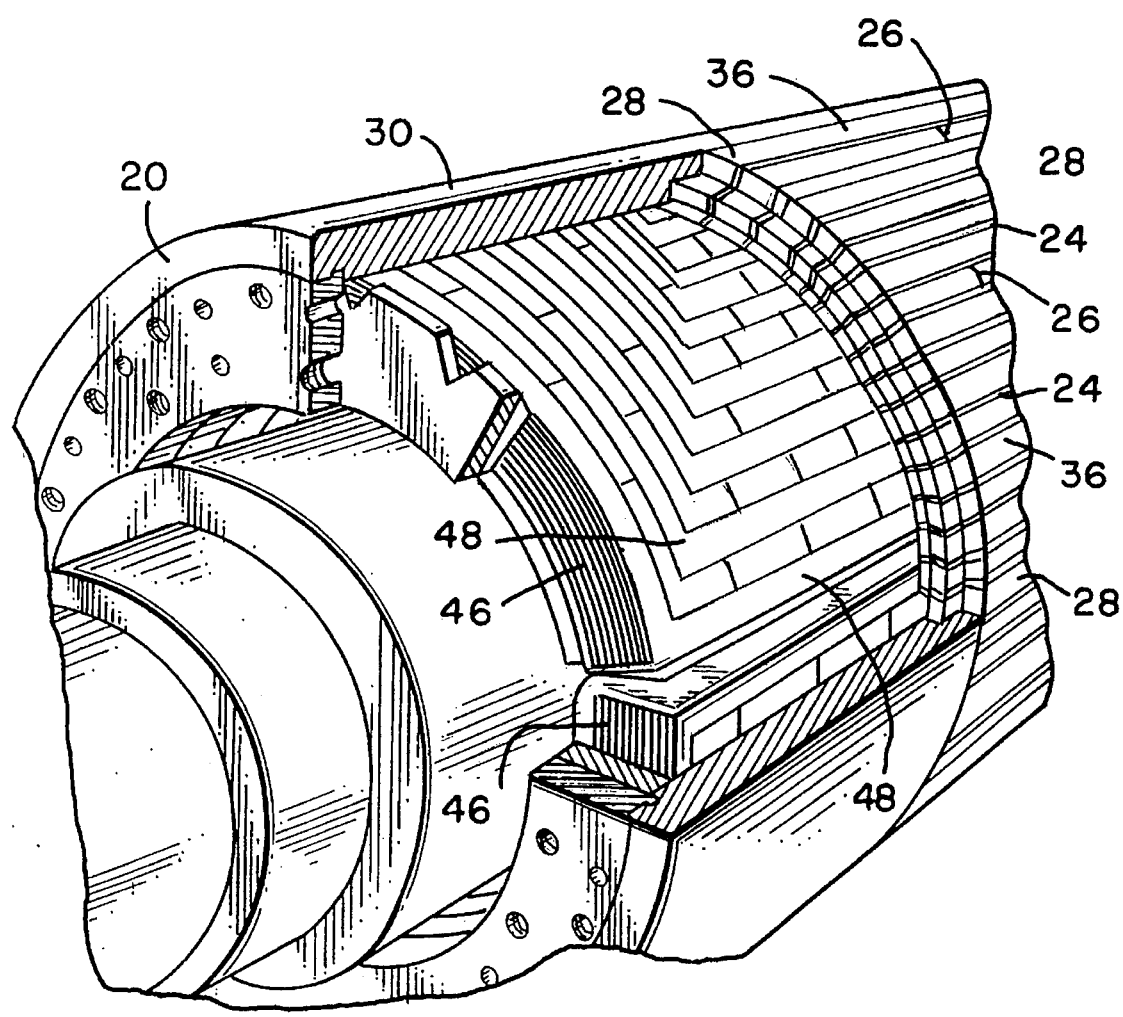
FIG. 9 is a cut-away illustration of rotor incorporating the invention.

FIG. 9 is a perspective illustration of a partially cut-away rotor, such as rotor 20, showing the bonded copper turns 46 which form the coils 48. The retaining ring 30 is cut-away to show the turns 46 and coils 48, but it can be seen that, in-board, the ring 30 is set upon end slot wedges 36, and further in-board, in slots 24, are the serially-arranged slot wedges 26.

There has been a need for motors which can be driven by adjustable speed drives. These latter, electronic speed controllers produce high frequency current harmonics in the input waveform for the subject motors. Higher frequency tends to cause currents closer to the surface of the rotor. Without the instant invention, then, the currents would have shared flow in the slot wedges 26 and rotor teeth 28 until reaching one of the gaps between adjacent wedges. The current would then travel only in the rotor teeth 28. The material of the rotor 20 has a high resistance and is nonlinear with frequency. This causes excessive heating on the rotor surfaces, and introduces the possibility of arcing The unwarranted heating may be asymmetric, causing rotor bowing, and leading to unacceptable rotor vibration. However, through the instant invention, the paths for currents are greatly improved, moving through the highly conductive wedges 26 and 36, retaining rings 30 and the intervening interconnects 42. Thus, the heating is greatly reduced, and the frequency effects of the adjustable speed drives are virtually eliminated.

Segmental wedge rotors are known in the prior art. However, it remained for this invention to teach the physical and electro-conductively interconnection of the serially-disposed slot wedges 26, via inserts 34, to define simulated conductor bars, and the electric continuity of the latter with the end ring-simulating retaining rings 30 via the end slot wedges 36 and interconnects 42. Our invention offers the industry a simple, but effective, means to provide an improved rotor system to handle the high frequency harmonics from the aforesaid adjustable speed drives and possible rotor currents from starting.

While we have described our invention in connection with a specific embodiment thereof, it is to be clearly understood that this is done only by way of example, and not as a limitation to the scope of our invention, as set forth in the objects thereof, and in the appended claims.

We claim:

1. In a rotor for electrical, rotating equipment, an amortisseur winding arrangement, comprising:

a rotor having (a) a rotary axis, and (b) axial slots formed in an outer periphery of said rotor;

a plurality of electrically-conductive wedges, set in said slots, for retraining rotor-carried coils against centrifugal-force-induced movement thereof; wherein said wedges are elongated and serially disposed in said slots so that each of said wedges has an end which substantially abuttingly engages an end of another of said wedges;

said wedge ends have axially-extended grooves formed therein; and means forceably set in said grooves, for physically joining, and electro-conductively interconnecting, each one of said wedges with at least another one of said wedges.

2. An amortisseur winding arrangement, according to claim 1, wherein:

said means comprises inserts; and said inserts are biasingly held in said grooves.

3. An amortisseur winding arrangement, according to claim 1, wherein:

said means comprises inserts;

said inserts are of a given length; and said grooves have a depth which is half said given length.

4. An amortisseur winding arrangement, according to claim 1, further including:

annular retaining means, at opposite ends of said rotor, cooperative with said wedges and said interconnecting means for defining end rings of said winding arrangement.

5. An amortisseur winding arrangement, according to claim 1, wherein:

said means are substantially wholly obscured by, an substantially wholly confined in, said grooves.

6. In a rotor for electrical, rotating equipment, an amortisseur winding arrangement, comprising:

a rotor having (a) a rotary axis, and (b) axial slots formed in an outer periphery of said rotor;

a plurality of electrically-conductive wedges, set in said slots, for restraining rotor-carried coils against centrifugal-force-induced movement thereof; wherein said wedges are elongated and serially disposed in said slots so that each of said wedges has an end abuttingly engages an end of another of said wedges;

said wedge ends have grooves formed therein;

means (a) forceably set in, and (b) wholly obscured by, and (c) wholly confined in, said grooves, for physically and electro-conductively interconnecting each one of said wedges with at least another one of said wedges;

said means comprises inserts;

transversely thereof, each groove describes an arc having a given radius; and transversely thereof, each insert describes an arc having a radius differing from said given radius.

* * * * *

UNITED STATES PATENT AND TRADEMARK OFFICE
CERTIFICATE OF CORRECTION

PATENT NO. : 5,606,211

DATED : Feb. 25, 1997

INVENTOR(S) : Darrell R. Morrison, et al

It is certified that error appears in the above—identified patent and that said Letters Patent is hereby corrected as shown below:

Column 2, line 3, before "are" insert - - 6 - - ;

Column 2, line 19, change "conventi" to - - conventional - - ;

Column 2, line 24, change "regaining" to - - restraining - - ;

Column 2, line 44, change "robe" to - - to be - - ;

Column 3, line 6, following "interconnect", insert - - 42. - - ;

Column 3, line 14, change "epicts" to - - depicts - - ;

Claim 1, line 6, change "retraining" to - - restraining - - ;

Claim 5, line 3, change "an" to - - and - - ; and

Claim 6, line 9, following "end", insert - - which - - .

Signed and Sealed this

Fifteenth Day of July, 1997

*Attest:*

BRUCE LEHMAN

*Attesting Officer*  *Commissioner of Patents and Trademarks*